United States Patent [19]
Curchod et al.

[11] 4,352,291
[45] Oct. 5, 1982

[54] WHEEL BALANCING MACHINE

[75] Inventors: Donald B. Curchod, Saratoga; Arthur K. Arnold, San Jose, both of Calif.

[73] Assignee: Nortron Corporation, Sunnyvale, Calif.

[21] Appl. No.: 221,919

[22] Filed: Dec. 31, 1980

Related U.S. Application Data

[63] Continuation of Ser. No. 42,144, May 24, 1979, abandoned, which is a continuation of Ser. No. 907,593, May 19, 1978, abandoned.

[51] Int. Cl.³ .......................................... G01M 1/22
[52] U.S. Cl. ...................................... 73/462; 73/477
[58] Field of Search .................. 73/459, 460, 462, 471, 73/473, 475–478

[56] References Cited

U.S. PATENT DOCUMENTS

| | | | |
|---|---|---|---|
| 2,466,748 | 4/1949 | Spencer . | |
| 3,132,519 | 5/1964 | Federn | 73/471 |
| 3,182,511 | 5/1965 | Federn et al. | 73/462 |
| 3,280,638 | 10/1966 | Hack | 73/462 |
| 3,732,737 | 5/1973 | Forster | 73/462 |
| 3,910,121 | 10/1975 | Curchod et al. | 73/462 |
| 4,149,416 | 4/1979 | Harant | 73/462 |

FOREIGN PATENT DOCUMENTS

| | | | |
|---|---|---|---|
| 1044531 | 11/1958 | Fed. Rep. of Germany . | |
| 7536274 | 11/1975 | Fed. Rep. of Germany . | |
| 2639344 | 2/1978 | Fed. Rep. of Germany . | |
| 1447854 | 6/1966 | France | 73/460 |
| 939693 | 10/1963 | United Kingdom . | |
| 957452 | 5/1964 | United Kingdom | 73/462 |
| 1091009 | 11/1967 | United Kingdom | 73/462 |
| 1247596 | 9/1971 | United Kingdom . | |
| 1294775 | 11/1972 | United Kingdom . | |
| 1420418 | 1/1976 | United Kingdom . | |

Primary Examiner—James J. Gill
Attorney, Agent, or Firm—Allegretti, Newitt, Witcoff & McAndrews, Ltd.

[57] ABSTRACT

A wheel balancing system for measuring imbalance forces derived from rotating an unbalanced wheel employs a stable pedestal of heavy, rigid material such as concrete or steel and a balancing assembly arranged to insure that all of the imbalance forces of a rotating unbalanced wheel and tire assembly will be directed via strain gauges in predetermined planes. A wheel balancing assembly measures imbalance forces acting in a given plane at a plurality of spaced positions disposed in spaced parallel planes with respect to a plane of rotation of the wheel.

20 Claims, 18 Drawing Figures

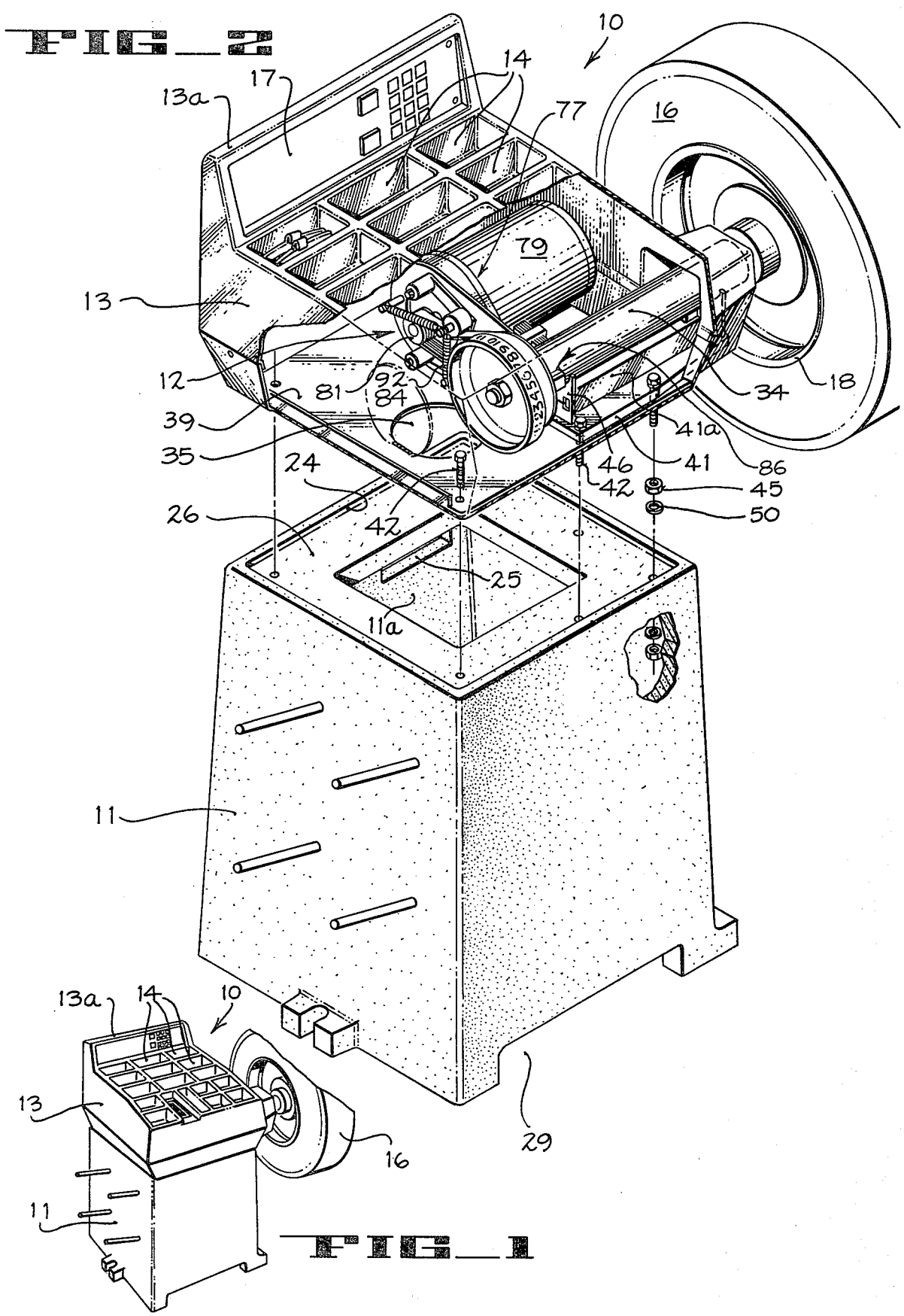

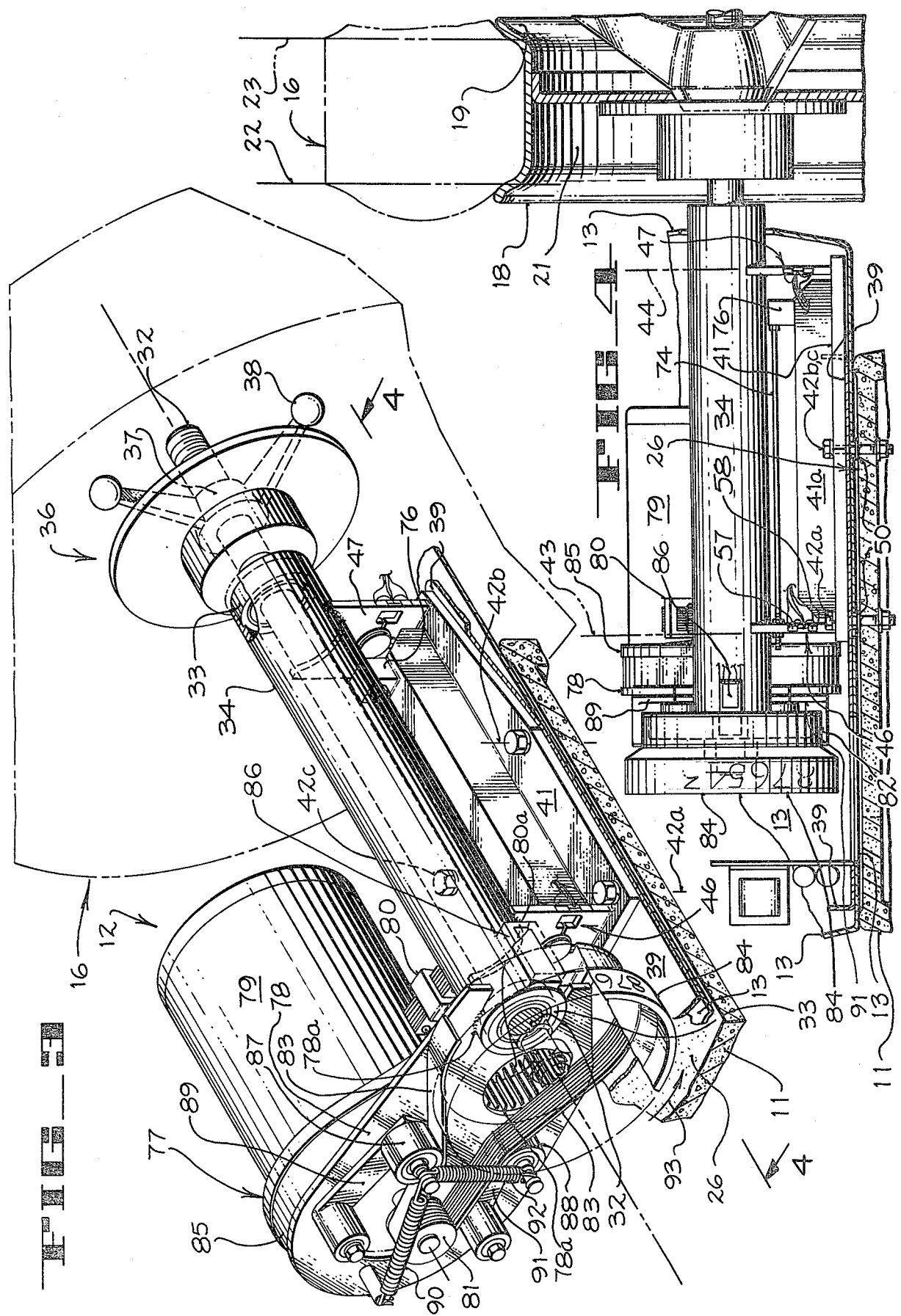

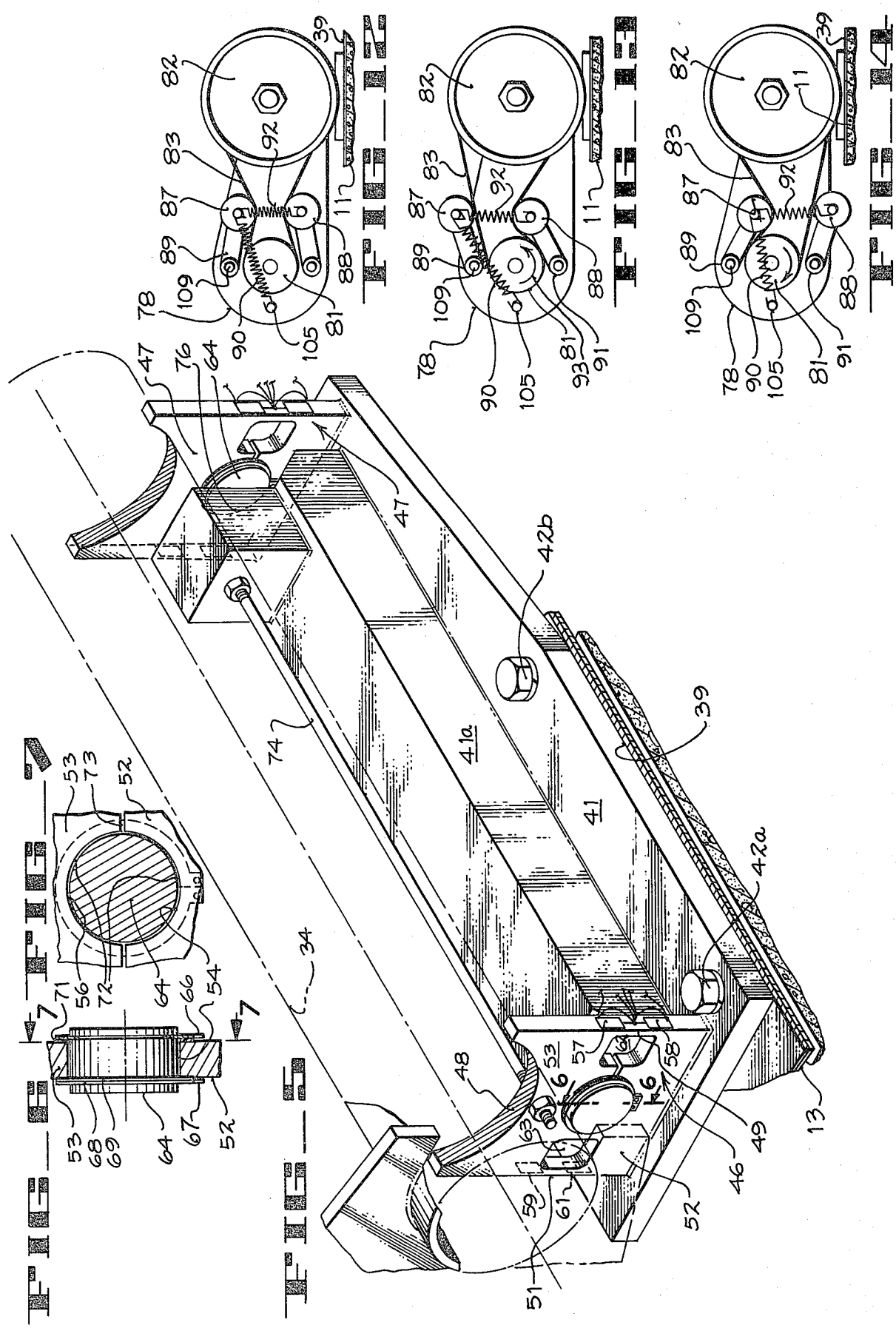

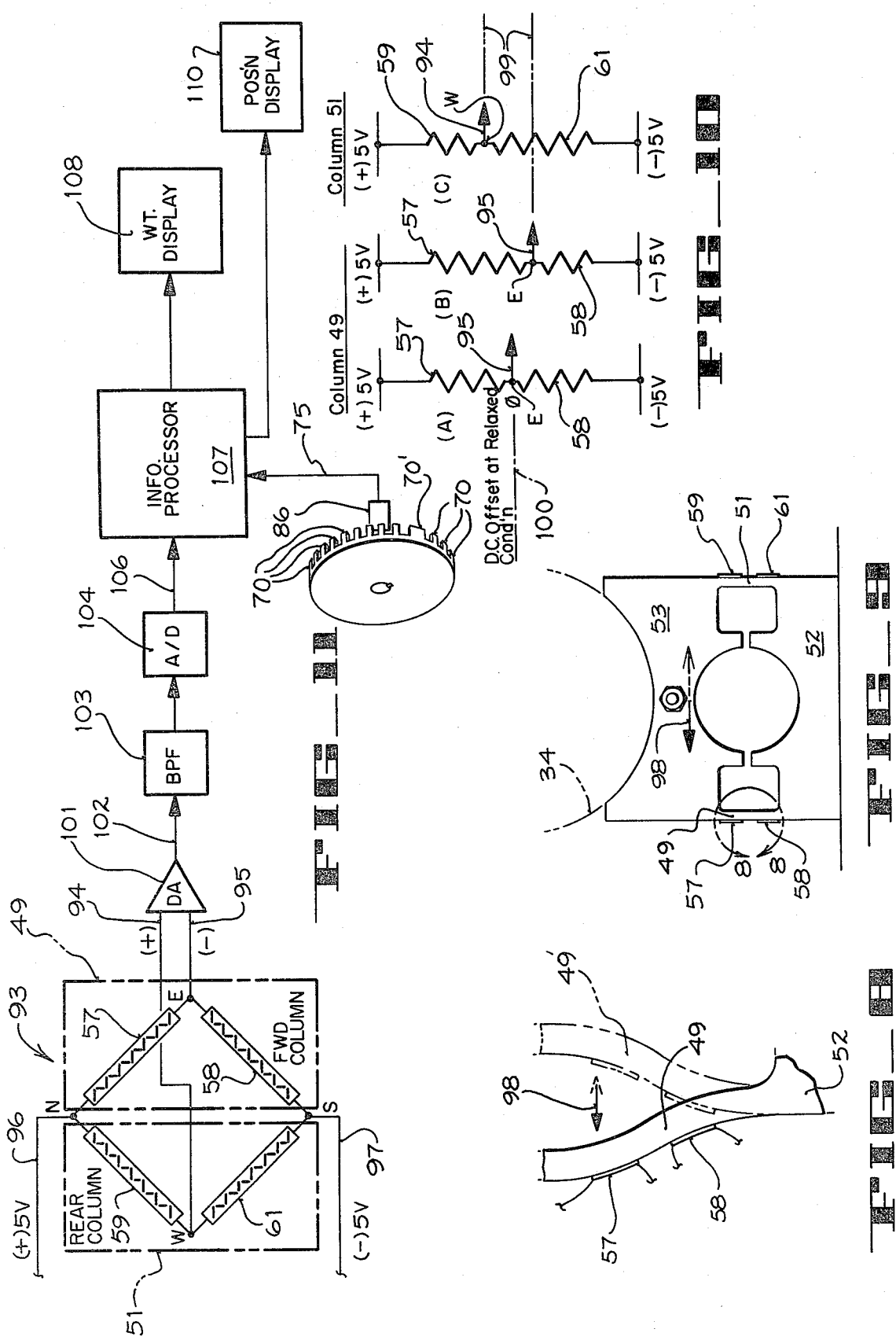

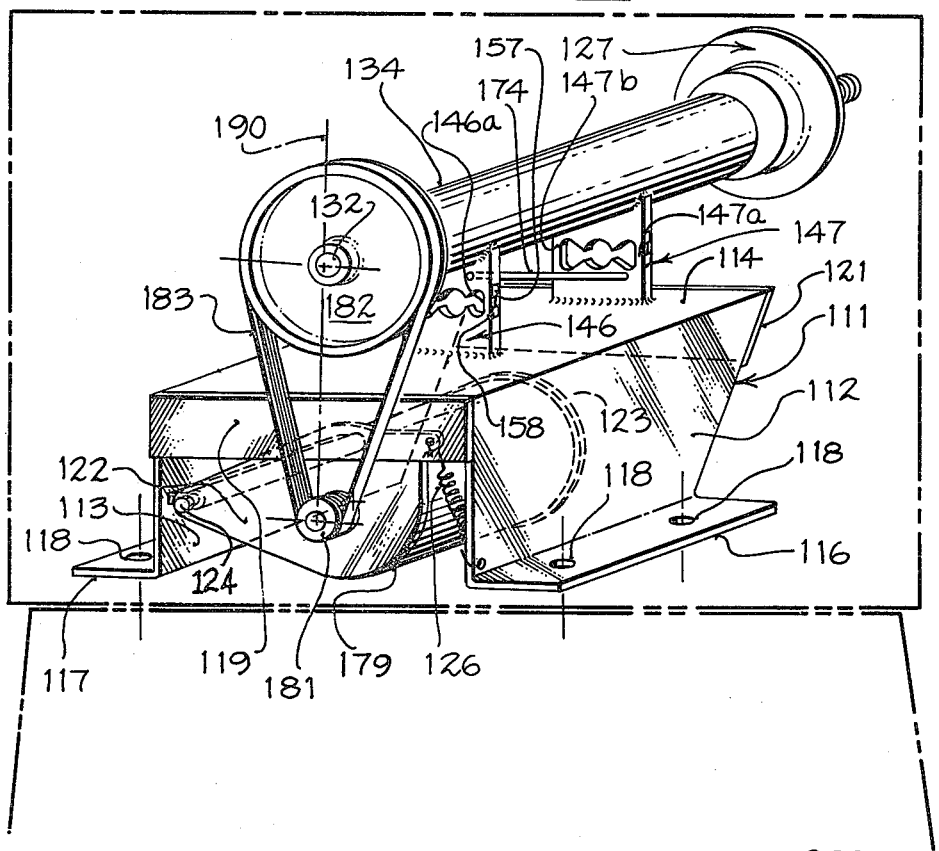
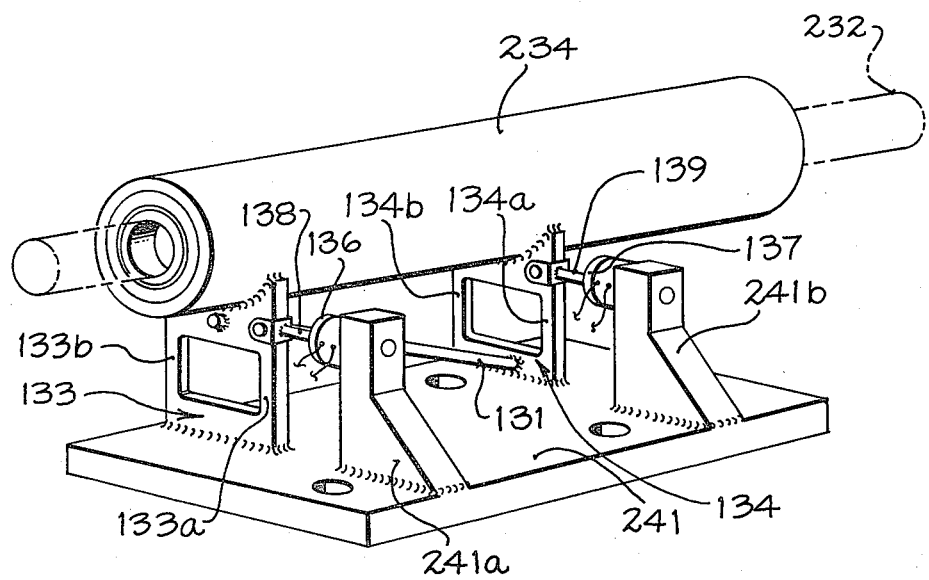

WHEEL BALANCING MACHINE

This is a continuation of Application Ser. No. 042,144 filed May 24, 1979, now abandoned, which is a continuation of application Ser. No. 907,593 filed May 19, 1978, now abandoned.

BACKGROUND OF THE INVENTION

This invention pertains to a wheel balancing machine and more particularly to a wheel balancing machine in which transducers for detecting the weight to be added to each of two side planes in a wheel/tire assembly are offset to the side of the plane of rotation of the wheel.

SUMMARY OF THE INVENTION AND OBJECTS

In general for a wheel balancing machine there is provided herein a rigid base and a balancing assembly supported by the base. The assembly is characterized by an elongate bearing housing and bearing means therein for supporting a drive shaft for rotation. One end of the drive shaft is disposed and adapted to readily removably receive thereon a wheel to be balanced. Means interposed between the bearing housing and the base serves to support the assembly and to confine movement of the housing to a predetermined plane substantially parallel to the base. The foregoing support means is disposed to be subject to imbalance forces derived from rotation of an unbalanced wheel on the shaft. These forces act in the predetermined plane and in a plurality of spaced parallel planes disposed substantially parallel to and spaced from a plane of rotation of the wheel. Finally, transducer means have been disposed to generate signals proportional of the imbalance forces acting thereon.

In general it is an object of the present invention to provide an improved, compact, and simplified wheel balancing machine.

It is another object of the present invention to provide a compact wheel balancing machine assembly and a stable pedestal for supporting the balancing assembly thereon so that the base portion of the balancing system can be constructed relatively locally with respect to the locus of its end use while the compact balancing machine assembly can be made at a more remote location and shipped to be joined with the support pedestal.

It is a further object of the present invention to provide a wheel balancing system mounted upon a stable support pedestal.

A further object of the present invention is to provide a wheel balancing machine of the kind described in which a bearing housing for supporting a drive shaft for rotating the wheel wherein the movement of the housing (and shaft) are confined to a single plane as supported by transducers disposed in spaced parallel planes spaced from the plane of rotation of the wheel.

It is a further object of the present invention to provide a wheel balancing machine according to the foregoing object in which the motive means for rotating the drive shaft is carried by the bearing housing.

It is a further object of the present invention to provide a wheel balancing system of the kind described in which strain gauge transducers are disposed upon associated support columns interposed between the bearing housing for the drive shaft and a base plate of the assembly.

It is yet another object of the present invention to provide flexure members serving to support the bearing housing carrying the drive shaft of the machine in which the flexure members are disposed in parallel relation to flex in parallel planes displaced from the side of the wheel and according to the present object means are provided to inhibit excessive flexing of the columns in a direction transversely of the planes in which they are arranged to flex.

An additional object is to provide flexure members of the kind described including means serving to limit the degree of flexing movements of the support columns within a predetermined range.

Another object of the invention is to provide means for controlling the path of a drive belt between a motor and the drive shaft during acceleration and deceleration so as to maintain tension in the belt at such times.

The foregoing and other objects of the invention will become more readily evident from the following detailed description of preferred embodiments when considered in conjunction with the drawings.

BRIEF DESCRIPTION OF THE DRAWINGS

FIG. 1 shows a diagrammatic perspective view of a wheel balancing system according to the invention;

FIG. 2 shows a diagrammatic perspective exploded view of a wheel balancing system according to the invention with the top cover removed;

FIG. 3 shows an enlarged diagrammatic perspective view of the wheel balancing assembly as shown in FIG. 2;

FIG. 4 shows a diagrammatic elevation section view of FIG. 3 taken along the line 4—4 thereof;

FIG. 5 shows a diagrammatic perspective view in enlarged detail of the supporting structure disposed beneath the bearing housing according to the invention;

FIG. 6 shows an enlarged end elevation view in section taken along the line 6—6 of FIG. 5;

FIG. 7 shows a side elevation section view of FIG. 6 taken along the line 7—7 thereof;

FIG. 8 shows a diagram representing a support column portion of a flexure member as at the line 8—8 of FIG. 9;

FIG. 9 shows a diagram in side elevation of a flexure member in the form of a support bracket, according to the invention;

FIGS. 10a, 10b, 10c schematically show a voltage divider in three different states thereof representing the resistances of strain gauges in support column 49, according to the invention;

FIG. 11 shows a schematic diagram of a system for providing a display of imbalance forces acting upon a support bracket as shown in FIG. 9;

FIGS. 12, 13 and 14 show diagrams of the operation of the belt drive arrangement respectively: at rest, during acceleration or rotation of the wheel clockwise (as viewed from the far side of pulley 82), and deceleration of the wheel by rotation of the drive pulley 81 in a reverse, or decelerating direction, according to the invention;

FIG. 15 shows a diagrammatic perspective view of a wheel balancing assembly, according to another embodiment of the invention;

FIG. 16 shows a diagrammatic perspective view according to another embodiment of the invention.

DESCRIPTION OF PREFERRED EMBODIMENTS

As shown in FIG. 1 a balancing machine 10 includes, a stable pedestal 11 of concrete supporting a wheel balancing assembly 12 (FIG. 2) enclosed by a protective cover 13. Cover 13 is formed of a sturdy plastic material including a number of pockets 14 or cups conveniently disposed in front of an operator using the machine for balancing a wheel and tire assembly 16 readily releasably carried on the distal end of a rotating drive shaft 32 as described below. As used herein, except where otherwise qualified, the term "wheel" will be deemed to mean a wheel and tire assembly as shown at 16 in FIGS. 1 and 3. Finally, cover 13 formed with an upwardly extending rear portion 13a provides a viewing panel 17 whereby displays of electronically generated information are provided for the operator to note the amount and position for weight to be added to both the inner and outer rims 18, 19 of wheel 21. Thus as shown in FIG. 4, the weights will be added in the planes 22, 23 of rotation of the wheel and tire assembly 16. As noted above a concrete pedestal 11 forms a stable sub-base for supporting assembly 12 thereabove.

As shown best in FIG. 2, the upper end of a stable concrete sub-base 11 is formed to include a transverse mounting web 26 for supporting a wheel balancing unit 12 secured thereto. The upper ends of the side walls of sub-base 11 extend slightly above the top plane of web 26 and form a lip 24 therearound.

An access opening 25 formed in the upper edge margin of the back wall 11a of base 11 permits an assembler to insert his hand and arm therethrough to attach washers and lock nuts to the ends of bolts 42 for tightly coupling balancing assembly 12 to sub-base 11 for transmission of forces thereto from assembly 12 when in operation.

As shown in FIG. 3 the bottom panel portion of cover 13 extends across web 26 to rest upon the raised upper edges 24. A reinforcing or finishing plate 39 lies upon the upper surface of the bottom panel portion of cover 13. A rigid base plate 41 is disposed upon the upper surface of finishing plate 39 but mounted to transmit unbalanced forces from assembly 12 to pedestal 11 via fastening means disposed at each of three positions 42a, b, c defined by bolts 42.

Thus, the fastening means which serves to secure the protective cover 13, finishing plate 39 and base plate 41 together comprises bolts 42 and associated nuts at positions 42a-c while using spacing means in the form of nuts 45 and their associated washers 50 disposed in related openings therearound formed in the underside of the bottom panel portion of cover 13.

Finally, at the lower edge margin of sub-base 11 a relieved toe-hole 29 is provided to permit the operator to conveniently approach the sub-base 11 while working and also to permit a fork-lift truck to handle the heavy sub-base 11. A corresponding toe-hole (not shown) is formed on the opposite side panel of sub-base 11. As thus arranged sub-base 11, being constructed of concrete provides a substantial and secure pedestal upon which the balancing assembly 12 can be mounted.

As shown best in FIG. 3 a drive shaft 32 is mounted in bearings 33 carried within a bearing housing 34 thereby supporting an unbalanced wheel 16 on one end thereof to be balanced. Wheel 16 is mounted by conventional mounting means 36 on shaft 32. Means 36 is characterized by a hub assembly 37 carried loosely about a threaded end 32a of shaft 32 whereby a threaded handle 38 can engage the hub 21 of the wheel 16 and upon rotation of handle 38 draw the hub 21 into engagement with assembly 37 so as to fix wheel 16 to rotate with shaft 32.

As thus arranged wheel 16 can be readily removably demounted from shaft 32 and a subsequent unbalanced wheel disposed thereon in conventional style.

Means interposed between bearing housing 34 and rigid base plate 41 serve to constrain movement of drive shaft 32 to a predetermined plane under the influence of imbalance forces from a rotating unbalanced wheel 16. Thus, flexure means are disposed to move in spaced substantially parallel planes 43, 44 which are themselves spaced substantially parallel to planes 22, 23 of rotation of rims 18, 19.

Accordingly, means for supporting bearing housing 34 comprises a pair of flexure assemblies 46, 47 welded to base plate 41. Each assembly 46, 47 as shown herein is substantially the same and, accordingly, it is believed that a description of flexure assembly 46 will be suitable for a description of both.

Flexure assembly 46 is formed in the nature of a bracket having an arcuate cradle surface 48 formed in its upper edge for supporting housing 34 welded therein.

Assembly 46 comprises a pair of spaced support columns 49, 51 and a pair of webs 52, 53 extending therebetween in a plane common to each. Webs 52, 53 include opposed semi-circular relieved portions 54, 56. Webs 52, 53 are spaced apart so as to permit the upper ends of support columns 49, 51 to flex between advanced and retracted positions in the plane of webs 52, 53.

In this way each of support columns 49, 51 can be subjected to a strain from imbalance forces acting against bearing housing 34 in a plane substantially normal to the support columns as described in greater detail further below.

Each flexure assembly 46 as shown herein carries transducer means for generating signals in response to forces acting on the flexure assemblies applied in planes spaced substantially parallel to the plane of rotation of wheel 16. Thus, the forces so applied are detected by means of a pair of strain gauges 57, 58 carried on support column 49 and (in order to enhance the signal and provide a redundant back-up system as described further below) a pair of strain gauges 59, 61 carried on support column 51. Strain gauges 57-59 and 61 generate signals in response to movement of the upper web 53 carrying the upper ends of each of columns 49, 51 with respect to their lower ends.

Support columns 49, 51 are defined by forming a pair of rectangular openings 62, 63 through each flexure member 46, 47 in a manner including both webs 52, 53.

Means serving to inhibit excess movement of one of webs 52, 53 with respect to the other in the plane of the two webs comprises a rigid insert 64 of suitable material, such as steel, disposed to be carried mutually within the opposed semi-circular portions 54, 56. Means securing insert 64 within the relieved portions includes the pair of snap rings 66, 67 disposed in slots 68 in the periphery of insert 64 on opposite sides of webs 52, 53. Annular spacers 69, 71 of compressible material, such as felt, are interposed between snap rings 66, 67 and the side faces of webs 52, 53 for purposes of absorbing any vibrations between insert 64 and rings 66, 67.

As shown in FIG. 7 an insert 64 fits loosely within the opening 72. The gap between insert 64 and opposed semi-circular portions 54, 56 limits the degree of travel between web 53 with respect to the web 52 in the plane of the two webs.

In this way an unduly unbalanced wheel which might otherwise cause excessive flexing of support columns 49, 51 can be guarded against.

It is to be observed that when a wheel 16 is placed upon hub assembly 37 it is reasonably predicable that a person so disposing wheel 16 may somewhat "toss" the wheel 16 onto the mounting end of shaft 32. It is to be further observed that such action would apply a longitudinal movement along bearing housing 34 which could conceivably damage one or the other or both of flexure assemblies 46, 47 and their associated support columns 49, 51 and strain gauges by excessive flexing.

Accordingly, an inelastic tendon 74 extends in spaced parallel relation to the axis of bearing housing 34 from a fixed anchoring in base extension 76 carried in fixed relation to a raised based portion 41a welded to the rigid base plate 41. The other end of tendon 74 is fastened through an opening in web 53 so as to preclude movement of housing 34 other than in a plane substantially normal to web 53. Snap rings 66, 67 and insert 64 also help absorb loads in this direction.

A motor/drive assembly 77 comprises a rigid mounting plate 78 formed with an arcuate end edge portion 78a for receiving bearing housing 34 therein to be welded thereto. Thus, housing 34 carries plate 78 in fixed relation thereto in cantilever style to support motor 78 is suitably mounted to plate 78 in a manner so as to drive the pulley 81 in either of two directions. A cyclic drive belt 83 trained about pulley 81 and a second pulley 82 carried on shaft 32 transmits power from motor 78 to rotate shaft 32.

A fan 80, carried by mounting plate 78, includes a fan blade 80a aligned with an opening 78a in mounting plate 78 to pump a supply of cooling air into or out of motor 79 via the duct formed by the enclosed hood 85 whereby a stream of cooling air can be drawn through or exhausted from the usual end openings found in the end plate of motor 79.

Means as described further below serves to detect the amount of weight which is required to add to a wheel rim in order to place the wheel in balance.

As heretofore disclosed in U.S. Pat. No. 4,007,642 means are disclosed for determining the angular location or weight placement on a wheel rim. Pulley 82 includes a flange 84 which carries a series of numbers thereon, each representative of an associated angular position of shaft 32 and hence of the wheel. Flange 84 represents such a system and means for detecting angular position for adding weight. However, it is to be understood that immediately inside pulley 82 a serrated surface is provided wherein each of a number of light passages is defined between pairs of teeth 70 by means of a suitable photosensor 86. Thus, while a series of equally spaced teeth pass the sensor, in one position of rotation of pulley 82 the spacing between one pair of teeth has been filled in so as to form a relatively long pulse indicating a "zero" position of the shaft (and hence the wheel) from which all other positions can be determined. This type of arrangement is shown clearly in the above identified patent and, accordingly, need not be pursued further herein.

Means for continuously removing substantially all slack from drive belt 83 during acceleration and deceleration modes of operation includes a pair of belt followers 87, 88 carried on the ends of associated pivot arms 89, 91 mounted to plate 78. A spring 92 common to both followers 87, 88 urges both followers 87, 88 into engagement with belt 83 to a position as shown in FIG. 12 when motor 78 is not accelerating or decelerating.

As shown in FIG. 13, corresponding to the condition of FIG. 3, drive pulley 82 rotates counterclockwise as shown by arrow 93 to accelerate rotation of wheel 16. In this mode the upper reach of belt 83 will become straightened to some extent thereby lifting follower 87 while the lower reach will take on additional slack. The upward movement of follower 87 carries the upper end of spring 92 upwardly with it so as to increasingly urge follower 88 to remove slack from the lower reach of belt 83.

As shown in FIGS. 12 through 14 belt following rollers 84, 88 are drawn together by means of a spring 82 so as to maintain tension in drive belt 83 and to minimize belt noise in the system.

It has been observed that slippage between belt 83 and pulley 81, 82 increases in direct relation to the degree to which belt 83 is wrapped about pulleys 81, 82. Slippage also is a factor of pulley diameter, motor torque applied and the characteristics of the belt with respect to slipping or not slipping. However, it has been observed to be advantageous to reduce the force pressing on belt 83 as the belt becomes straighter during acceleration (or deceleration) in order to minimize slippage. Accordingly, a compensating spring 90 extends between a fixed post 105 disposed in a plane taken through the axes of pulleys 81, 82. Spring 90 is connected at its opposite end to the axis of belt follower 87.

In this manner it will be readily evident that as belt follower 87 moves upwardly during acceleration spring 90 will be extended slightly to increase its force but at the same time the effective force applied to follower 87 will be reduced by virtue of the fact that the moment arm acting on follower 87 will progressively decrease to zero when the axis of follower 87 and post 105 are in direct alignment with the pivot point 109.

It has further been observed that the acceleration mode provides less problems than the deceleration mode so that as noted in FIG. 14, whenever the drive motor is reversed to reverse the torque applied to drive pulley 81 for decelerating the rotation of the wheel, belt follower 87 will be disposed on the slack side of belt 83. At this time the leverage on follower 87 will increase by means of the compensating spring 90 and position of pivot arm 89 while belt follower 88 moves downwardly to permit the lower reach of belt 83 to become straightened. Pressure on the lower reach of belt 83 is further reduced by the fact that the upper end of spring 92 moves downwardly as arm 89 is drawn down by spring 90.

With reference to FIGS. 8–11, operation of the system is as follows, with respect to each of the flexure assemblies 46, 47 for detecting the degree of weight required to be added in the two planes defined by the rims of the wheel.

The strain gauges herein are constructed in a manner whereby under compression they take on an increased cross section so as to lower their resistance. Placing them in tension causes them to take on a reduced cross section so as to increase resistance. For example, as shown in FIG. 8, when web 53 moves to the left (in FIG. 9) strain gauge 57 is somewhat "stretched" along the resultant convex bend in column 49 to place gauge 57 in tension. On the contrary strain gauge 58 is shown at the same time in compression along the "concave" bend then formed in support column 49.

As shown in FIG. 11 if (+)5 volts is supplied to line 96, (−)5 volts applied to line 97 and lines 96 and 97 are connected to points N and S, the voltage at E will theoretically be zero when both strain gauges 57, 58 are in their relaxed positions (with support column 49 standing upright). In practice, a DC offset will normally be required to compensate for differences in resistance values developed by each specific strain gauge for a predetermined degree of bending.

However, in rotating an unbalanced wheel, forces will act back and forth in a given plane as above described so that, for example, a force acting in the direction of arrow 98 will cause strain gauge 57 to be placed in tension and reduce its cross-section and increase its resistance. By increasing the resistance between points N and E the output point between strain gauges 57, 58 at E will be lowered as represented by the voltage divider diagram in FIG. 10(B). Similarly, as support column 49 flexes in an opposite direction to the phantom line position 49′ (FIG. 8) the output point E will rise above the mid point shown in FIG. 10A to drop down again as shown in FIG. 10B.

It is to be observed in the diagrams shown in FIGS. 8 and 9 that whenever the upper web 53 is moved to the left to place upper strain gauge 57 in tension upper strain gauge 59 is placed in compression. Accordingly, by placing upper strain gauge 59 in compression (and its associated lower strain gauge 61 in tension) the resistance in strain gauge 59 will be reduced while the resistance in gauge 61 will be substantially increased as shown in FIG. 10C where the output point W has risen above line 100. Thus, the output at E falls as the output at W rises and vice verse whereby by reading out bridge 93 from points E and W there will be a varying output signal in response to the varying resistance displacement 99 to provide an enhanced signal.

It is to be observed that by using a system of the kind shown in FIG. 11 there will be substantially no increase in noise in the electrical signal and the current will remain constant notwithstanding variations in the imbalance forces acting upon the strain gauges.

While it might be possible to substitute resistances for strain gauges 59, 61 of equal value and still obtain an output signal as shown in FIG. 10B the signal is significantly enhanced by employing strain gauges on both support columns in the manner above described so that with substantially little cost a more desirable signal is achieved. Thus, the output from bridge 93 appears between leads 94, 95 to be supplied to a differential amplifier 101. The output from amplifier 101 on line 102 is fed through a band pass filter 103 so as to eliminate signals from any spurious sources. The analog signals from filter 103 are then converted to digital signals by the analog to digital converter 104 so they can be fed via line 106 to a suitable information processor for determining the amount of weight to be added in each of planes 22, 23 taken from the force determinations detected in planes 43, 44. A display 108 receives this information and displays it for an operator to observe and employ.

As noted above, the angular position for applying the weight is detected by means of the photosensor 86 disposed to detect the passage of a series of teeth 70 carried within pulley 82. The teeth are counted commencing with a reset position identifiable to the photosensor 86 by means of the elongate tooth 70′ which extends the length of approximately three teeth 70. These counting pulses are fed along line 75 to the information processor 107. Processor 107, accordingly, generates an output controlling display means 110 whereby the angular position will be indicated.

It is to be observed that by supporting motor 79 to be carried by housing 34 out of contact with stationary portion of the machine, i.e. disposed free of the top of the machine, substantially no other vibrating forces will be applied to drive shaft 32 and bearing housing 34 as could otherwise occur by mounting the motor separately from the bearing housing 34.

However, it is also to be noted that motor 79 can be disposed to orient the movement of the drive belt substantially in the plane of strain gauges 57–61 since any unusual downward force applied to pulley 82 by drive belt 83 will cause the strain gauges to act substantially equally in compression and tension and accordingly introduce no change in the output voltage at E as shown in FIG. 10.

Accordingly, as shown in FIG. 15 another embodiment of the invention includes a motor 179 with a drive pulley 181 for driving belt 183 for rotating pulley 182. In this arrangement motor 179 is separately mounted from bearing housing 134 but its forces lie substantially in the plane of strain gauges 157, 158, 159 and 161 (the latter two not being shown, but corresponding to strain gauges 59 and 61 as described above relative to gauges 57, 58 with respect to flexure assemblies 46 and 47).

As noted above, according to the embodiment shown in FIG. 15, means are provided for supporting drive motor 179 independently of bearing housing 134 for rotating a drive shaft 132 as now to be described. A base plate extension unit 111 comprises upwardly directed sidewalls 112, 113 and a top platform 114 extending therebetween. Means for securing unit 111 to the upper end of pedestal 11 comprises the flanges 116, 117 formed with opening 118 therethrough for receiving fastening means, such as bolts therethrough. Rigidity is imparted to unit 111 by making the structure initially of a rigid or semi-rigid material and providing at least partial ends 119, 121 welded to sidewalls 112, 113.

Means supporting motor 179 comprises a pair of pivot plates 122, 123 mounted to the ends of a pivot rod 124 carried within unit 111. One pivot plate of sufficient rigidity may used.

It is to be observed that the weight of the motor serves to urge drive pulley 181 downwardly and thereby add tension to belt 183. However, it has been further observed that it is desirable to add a relatively high tension spring 126 extending between sidewall 112 and an outer end of pivot plate 122. In this way spring 126 serves to stabilize vertical movement of motor 179 and drive pulley 181.

Bearing housing 134 is supported by means of flexure member 146, 147 of a type including flexible, semi-rigid support columns corresponding to those of flexure member 46, 47 described above.

Each flexure member 146, 147 is welded along its lower end edge to the top surface of platform 114 so that each of members 146, 147 is disposed in a parallel plane with respect to the other and with respect to the plane of rotation of a wheel when mounted upon the mounting hub assembly 127. Accordingly, each flexure member is formed to include a pair of support columns and strain gauge elements carried thereon as above described.

By virtue of the fact that motor 179 is mounted independently of housing 134, changes in tension in drive belt 183 will introduce no spurious signals to the system since belt 183 is disposed in a position relative to shaft 132 to cause all belt tensioning forces to act in compression on the strain gauges of member 146 and in tension on strain gauges of member 147, thereby maintaining point E (FIGS. 10, 11) at a constant position.

In the embodiment as shown in FIG. 15, means have been provided which serve to inhibit excessive axial movement of bearing housing 134 when wheel 16 is carelessly tossed onto the end of drive shaft 132. Accordingly, an elongate inelastic tendon 174 extends from the lower portion of flexure member 147 adjacent the position where member 147 is welded to platform 114. The opposite end of tendon 174 is secured to the upper portion of member 146. Thus, the first end of tendon 174 is anchored in a fixed position so as to preclude excessive movement of flexure member 146 with axial movement of bearing housing 134.

According to another embodiment as shown in FIG. 16, and having in mind the foregoing embodiments, a compact, reliable and relatively simple balancing unit 130 is constructed from a relatively few parts carried on a mounting plate 241 arranged to be attached to the top of a table sub-base 11. Thus, a bearing housing 234 supports drive shaft 232. Bearing housing 234 is supported in spaced relation from the rigid base plate 241 by means of a pair of spaced parallel flexure members 133, 134, welded to plate 241. Each of members 133, 134 include a pair of support columns 133a, b and 134a, b, of a kind as described above. Flexure members 133, 134 each carry force transmission elements or rigid rods 138, 139 extending between one edge of the flexure member and an associated piezoelectric force transducer 136, 137. Force transducers 136, 137 are respectively carried at the upper end of fixed base plate extension 241a and 241b welded to the upper side of base plate 241.

As thus arranged bearing housing 234 and associated drive shaft 232 are constrained to move in a predetermined plane substantially normal to support columns 133a, b and 134a, b. Movement of these support columns is readily sensed by means of force transducers 136, 137 disposed in spaced relation to each other and spaced from a plane of rotation of wheel 16 about the axis thereof. Thus, transducers 136, 137 supply electrical signals to a suitable system for evaluating same and providing information to the operator.

Piezoelectric force transducers have heretofore been known and systems which employ their outputs have been known. Accordingly, it is believed that it is not necessary to go beyond the foregoing explanation for this embodiment.

Finally, a transversely extending tendon 131 anchored in the base of flexure member 134 which will, as described above, provide a relatively immovable portion thereof in view of the fact that it is anchored closely adjacent the weld connecting member 134 to the top of base plate 241 and extends to the upper portion of flexure member 133 to be secured thereto. Tendon 131, accordingly, serves to inhibit excessive axial movement of drive shaft 232 and bearing housing 234 so as to protect each of the flexure members 133, 134 (welded to housing 234) from damage when a wheel and hub are mounted onto the end of drive shaft 232.

From the foregoing it will be readily evident that there has been provided an improved tire balancing machine employing strain gauge means for detecting imbalance forces in parallel planes spaced from the rims of the wheels.

We claim:

1. In a wheel balancing machine comprising a rigid base, an elongate rigid bearing housing, bearing means carried within said housing at axially spaced positions, a drive shaft supported for rotation by said bearing means, one end of said shaft being disposed and adapted to readily removably receive a wheel to be balanced, a drive motor carried by said housing and disposed to move therewith independently of said base, means interposed between said housing and said base at first and second axially spaced positions along said housing serving to confine movement of said housing to a plane substantially parallel to said base, said housing, motor and the last named means all lying substantially entirely within the periphery of the tire projected laterally therefrom coaxially of said bearing housing, the last named means being disposed to be subjected to imbalance forces derived from rotation of an unbalanced wheel on said shaft, said forces acting in said plane and in a plurality of spaced parallel planes disposed substantially parallel to and spaced from a plane of rotation of the wheel, and means carried by the second named said means to generate signals proportional to the imbalance forces acting thereon.

2. In a wheel balancing machine according to claim 1 in which said second named means comprises at least one support flexure in each of said plurality of spaced parallel planes, and the last named means includes strain gauge means responsive to bending movements of said flexure.

3. In a wheel balancing machine comprising a rigid base, an elongate rigid bearing housing, bearing means carried by said housing, a drive shaft supported for rotation by said bearing means, one end of said shaft being disposed and adapted to readily removably receive a wheel to be balanced, a pair of substantially parallel semi-rigid flexible support columns disposed in each of two planes lying substantially parallel to a plane of the wheel to be balanced and supporting said housing, a drive motor carried by said housing and disposed to move therewith independently of other portions of the machine, said columns being disposed to be subjected to imbalance forces derived from rotation of the wheel, said columns serving to confine said imbalance forces to act in a plane substantially normal to said columns to flex said columns in response to said imbalance forces acting thereagainst via said housing, strain gauge means carried by at least one of said columns in each of said pairs to generate signals proportional to the imbalance forces thereat.

4. In a wheel balancing machine comprising a rigid base, an elongate bearing housing, bearing means carried by said housing, a driveshaft supported for rotation by said bearing means, one end of said shaft being disposed and adapted to readily removably receive a wheel to be balanced, a plurality of flexure members forming support columns interposed between said housing and said base serving to confine movement of said housing to a plane substantially normal to said columns, said columns being disposed to be subjected to imbalance forces derived from rotation of a wheel on said shaft, said forces acting in said plane and in a plurality of spaced parallel planes disposed substantially parallel to and spaced from a plane of rotation of the wheel, and strain gauge means carried by said flexure members to generate signals proportional to the imbalance forces acting thereon said plurality of flexure members comprising at least a spaced parallel pair of flexure assemblies, each said assembly comprising a pair of spaced support columns and a pair of webs therebetween in a plane common to each, said webs including opposed relieved edge portions to permit a portion of said columns to move with respect to another portion thereof, and means serving to inhibit excess movement of one of said webs with respect to the other in the plane thereof, the last named means comprising a rigid insert disposed to be carried mutually within said opposed relieved portions.

5. In a wheel balancing machine comprising a rigid base, a drive shaft having an end adapted to carry an unbalanced wheel thereon to be balanced, means supporting said shaft to be constrained to move in substantially a single plane, said support means including flexure means disposed to move in spaced substantially parallel planes spaced substantially parallel to the planes of rotation of the rims of a wheel carried on the end of said shaft, and transducer means coupled to said flexure means for generating signals in response to movement of said flexure means in the first named parallel planes further comprising drive means coupled to rotate said shaft, said drive means including a motor, pulleys carried respectively by said driveshaft and said motor, a cyclic belt trained about said pulley to form a first and second reach therebetween, and means for maintaining tensions in both said reaches of said belt during acceleration, deceleration and steady state operation of said motor, the last named means comprising first and second belt follower rollers, pivot arms respectively carrying said rollers to move in contact with said belt between advanced and retracted positions, spring means common to both said rollers for drawing same together against their respective reaches of said belt while permitting the rollers to move away from each other as one or the other of said two reaches becomes straightened by acceleration or deceleration forces applied thereto, and a compensating spring anchored to extend between a fixed point and the outer end of one of said pivot arms to cause a reduction in force applied by an associated one of said rollers riding against said first reach during acceleration of said drive means and to increase the force applied to said belt during deceleration.

6. In a wheel balancing machine comprising a rigid base, a drive shaft having an end adapted to carry an unbalanced wheel thereon to be balanced, means supporting said shaft to be constrained to move in substantially a single plane, said support means including an elongate rigid bearing housing carrying said shaft therein, flexure means disposed to move in spaced substantially parallel planes spaced substantially parallel to the planes of rotation of the rims of a wheel carried on the end of said shaft, and transducer means coupled to said flexure means for generating signals in response to movement of said flexure means in the first named parallel planes, further in which the first named means comprises a plurality of flexure members forming support columns interposed between said housing and said base serving to confine movement of said housing to a plane substantially normal to said columns, said columns being disposed to be subjected to imbalance forces derived from rotation of a wheel with said shaft, said forces acting in said plane and in a plurality of spaced parallel planes disposed substantially parallel to and spaced from a plane of rotation of the wheel, drive means carried by said housing to move therewith, said drive means being coupled to rotate said shaft, said drive means including a motor, pulleys carried respectively by said shaft and said motor, a cyclic belt trained about said pulleys to form a first and second reach therebetween, said rotational axis of said pulleys being disposed to define a plane substantially perpendicular to and lying between said support columns so as to apply only a compressive force to said columns.

7. In a wheel balancing machine comprising a balancing unit including a drive shaft having an end adapted to carry an unbalanced wheel thereon to be balanced, means supporting said shaft to be constrained to move in substantially a single plane, said support means including flexure means disposed to move in spaced substantially parallel planes spaced substantially parallel to the planes of rotation of the rims of a wheel carried on the end of said shaft, transducer means coupled to said flexure means for generating signals in response to movement of said flexure means in the first named parallel planes, a base plate for supporting said flexure means and said bearing housing therefrom, and a concrete pedestal formed independently of said balancing unit, said pedestal having a broad top portion for supporting said base plate thereon, and fastening means for readily detachably coupling said pedestal to said base plate in fixed relation therebetween for receiving and stabilizing said imbalance forces transmitted thereto via said fastening means, said pedestal comprising a hollow body of concrete formed to include bottom and top ends thereof, said bottom end being formed to be carried by a support surface, said top end being characterized by a web of concrete therearound within the periphery of said top end, said web having a relatively large central opening extending axially therethrough, said web being disposed in substantially parallel relation with respect to the support surface, a plurality of at least three openings disposed in a triangular configuration in a peripheral portion of said web, the last named openings serving to receive said fastening means therethrough for coupling said pedestal to said base plate, and a sufficiently large access opening formed through the side wall of said body to permit an assembler to insert his hand and arm into and across the interior of said body when securing a portion of said fastening means beneath said web.

8. In a wheel balancing machine of a type having a rigid base plate for mounting a balancing unit thereon, a base assembly comprising a stable pedestal having a hollow body of concrete formed to include bottom and top ends thereof, said bottom end being formed to be carried by a support surface, said top end being characterized by a web of concrete therearound within the periphery of said top end, said web having a relatively large central opening extending axially therethrough, said web being disposed in substantially parallel relation with respect to the support surface, a plurality of at least three openings disposed in a triangular configuration in a peripheral portion of said web, the last named said openings serving to receive fastening means therethrough adapted to readily detachably couple said pedestal to the base plate, and a sufficiently large access opening formed through the side wall of said body to permit an assembler to inert his hand and arm into and across the interior of said body when securing a portion of said fastening means beneath said web.

9. A wheel balancing machine comprising, in combination:

a rigid base including a rigid frame defining a pedestal having a hollow body, at least one rigid bearing housing means, bearing means carried by said housing means at axially spaced positions, a drive shaft having first and second ends supported for rotation by said bearing means, said first end of said drive shaft being disposed and adapted to readily removably receive a wheel-mounted tire to be balanced, at least two sensing means, interposed between said housing means and said base at axially spaced positions along said drive shaft, for sensing rotational forces, each of said sensing means defining a position of a plane that is perpendicular to said drive shaft, motor means for rotating said drive shaft, said motor means (1) being fixed substantially between said planes whose positions are defined by said sensing means and (2) including an elongate central shaft, said central shaft being rotatably coupled to said second end of said drive shaft, fastening means for detachably coupling said sensing means to said frame in a fixed relation thereto for receiving and stabilizing said forces, said housing means, bearing means, drive shaft, sensing means, motor means, and fastening means all lying substantially entirely within the periphery of said wheel-mounted tire projected laterally therefrom coaxially of said drive shaft.

10. A wheel balancing machine comprising, in combination:

a rigid base, at least one rigid bearing housing means, bearing means carried by said housing means at axially spaced positions, a drive shaft having first and second ends supported for rotation by said bearing means, said first end of said drive shaft being disposed and adapted to readily removably receive a wheel-mounted tire to be balanced, at least two sensing means, interposed between said housing means and said base at axially spaced positions along said drive shaft, for sensing rotational forces, each of said sensing means defining a position of a plane that is perpendicular to said drive shaft, motor means for rotating said drive shaft, said motor means (1) being fixed substantially between said planes whose positions are defined by said sensing means and (2) including an elongate central shaft, said central shaft being rotatably coupled to said second end of said drive shaft, said housing means, bearing means, drive shaft, sensing means, and motor means all lying substantially entirely within the periphery of said wheel-mounted tire projected laterally therefrom coaxially of said drive shaft, said base including a rigid plate for supporting said sensing means, a pedestal for supporting said plate thereon, and fastening means for coupling said pedestal to said plate in fixed relation thereto for receiving and stabilizing said forces.

11. A wheel balancing machine comprising, in combination:

a rigid base, at least one rigid bearing housing means, bearing means carried by said housing means, a drive shaft having first and second ends supported for rotation by said bearing means, said first end of said shaft being disposed and adapted to readily removably receive a wheel-mounted tire to be balanced, a plurality of flexure members forming support columns interposed between said housing and said base for confining movement of said housing to a plane substantially normal to said columns, said columns being disposed to be subjected to imbalance forces derived from rotation of said wheel-mounted tire with said drive shaft, said forces acting in said plane and via said housing in a plurality of spaced parallel planes disposed substantially parallel to and spaced from a plane of rotation of said wheel-mounted tire, said base including a base plate for supporting said flexure members and said bearing housing means therefrom, strain gauge means carried by said flexure members for generating signals proportional to imbalance forces acting thereon, each of said strain gauge means defining a position of a plane that is perpendicular to said drive shaft, motor means for rotating said drive shaft, said motor means (1) being fixed substantially between said planes whose positions are defined by said strain gauge means and (2) including an elongate central shaft, said central shaft being rotatably coupled to said second end of said drive shaft, a pedestal having a broad top portion for supporting said base plate thereon, and fastening means for coupling said pedestal to said base plate in a fixed relation thereto for receiving and stabilizing said imbalance forces, said housing means, bearing means, drive shaft, flexure members, and motor means all lying substantially entirely within the periphery of said wheel-mounted tire projected laterally therefrom coaxially of said drive shaft.

12. A wheel balancing machine, according to claims 9, 10, or 11, further comprising position encoding means for generating signals indicative of the angular position of said drive shaft.

13. A wheel balancing machine, according to claim 12, wherein the position encoding means comprises a plurality of teeth arranged in a circular pattern.

14. A wheel balancing machine, according to claim 13, wherein the teeth are connected to a pulley mounted on said drive shaft.

15. A wheel balancing machine, according to claim 14, wherein the fastening means comprises a plurality of bolts.

16. A wheel balancing machine, according to claim 15, wherein said base is arranged to position said drive shaft in a substantially horizontal plane.

17. A wheel balancing machine, according to claims 9, 10, or 11, wherein said motor means is coupled to said second end of said drive shaft by a belt and a pulley connected to said second end of said drive shaft and wherein said pulley carries a plurality of teeth arranged in a circular pattern, said teeth forming a portion of position encoding means for generating signals indicative of the angular position of said drive shaft.

18. A wheel balancing machine, according to claim 17, wherein the axis of rotation of said central shaft of said motor means is substantially parallel to the axis of rotation of said drive shaft.

19. A wheel balancing machine according to claim 18, wherein the fastening means comprises a plurality of bolts and wherein said base is arranged to position said drive shaft in a substantially horizontal plane.

20. A wheel balancing machine, according to claim 19, wherein said belt rotates in a plane substantially perpendicular to the axis of rotation of said drive shaft.

* * * * *